US011939909B2

(12) United States Patent
Shimozono

(10) Patent No.: US 11,939,909 B2
(45) Date of Patent: Mar. 26, 2024

(54) WORK MACHINE

(71) Applicant: HONDA MOTOR CO., LTD., Tokyo (JP)

(72) Inventor: Kazuki Shimozono, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 263 days.

(21) Appl. No.: 17/440,384

(22) PCT Filed: Mar. 22, 2019

(86) PCT No.: PCT/JP2019/012232
§ 371 (c)(1),
(2) Date: Sep. 17, 2021

(87) PCT Pub. No.: WO2020/194406
PCT Pub. Date: Oct. 1, 2020

(65) Prior Publication Data

US 2022/0154635 A1 May 19, 2022

(51) Int. Cl.
*F02B 53/04* (2006.01)
*F02B 63/04* (2006.01)

(52) U.S. Cl.
CPC .......... *F02B 63/048* (2013.01); *F02B 63/044* (2013.01); *F02B 2063/045* (2013.01); *F02B 2063/046* (2013.01)

(58) Field of Classification Search
CPC ............................ F02B 63/048; F02B 63/044; F02B 2063/045; F02B 2063/046
See application file for complete search history.

(56) References Cited

U.S. PATENT DOCUMENTS

2019/0059240 A1* 2/2019 Scott ...................... A01G 9/022

FOREIGN PATENT DOCUMENTS

| | | |
|---|---|---|
| CN | 207366039 | 5/2018 |
| CN | 208794827 U * | 4/2019 |
| JP | 58-097956 | 7/1983 |
| JP | 02-009399 | 1/1990 |
| JP | 0-090335 | 7/1990 |
| JP | H02-090335 U | 7/1990 |
| JP | H07-274426 | 10/1995 |

(Continued)

OTHER PUBLICATIONS

International Preliminary Report on Patentability dated Oct. 7, 2021, 7 pages.

(Continued)

*Primary Examiner* — Joseph J Dallo
(74) *Attorney, Agent, or Firm* — Rankin, Hill & Clark LLP

(57) ABSTRACT

A work machine that can discharge water collected inside a casing to the outside, reduce leakage of noise, and reduce entry of foreign matter from outside. The work machine includes a bottom portion cover forming a portion of a casing, and the bottom portion cover includes: at least two ribs and a bead (strengthening structure portions) that are formed substantially perpendicular to a bottom surface of the bottom portion cover; and a drain hole located in a connecting portion connecting the bottom surface of the bottom portion cover and a water-discharging rib among the at least two ribs. An upper portion of the water-discharging rib is located over the drain hole.

6 Claims, 6 Drawing Sheets

(56) References Cited

FOREIGN PATENT DOCUMENTS

WO WO-2005032935 A1 * 4/2005 .............. B60L 11/14

OTHER PUBLICATIONS

European Search Report dated Jan. 25, 2022, 6 pages.
Japanese Office Action with English translation dated Apr. 19, 2022, 5 pages.
International Search Report, dated Jun. 11, 2019, 2 pages.
Written Opinion of the International Searching Authority dated Jun. 12, 2019 filed in PCT/JP2019/012232, 4 pages.

* cited by examiner

WORK MACHINE

TECHNICAL FIELD

The present invention relates to a work machine.

BACKGROUND ART

For work machines such as, for example, generators, there has conventionally been a desire to reduce noise due to vibration caused by drive units such as engines or electric motors.

On the other hand, their casings include drain holes for discharging, to the outside, condensation water internally generated and external water that has entered the casings.

Among such conventional techniques, a technique is disclosed in which ribs are arranged about the outer circumference of a housing, each of the ribs is discontinuous, a reinforcement rib is placed facing a gap of each of the ribs on one side or both sides of the gap, the reinforcement rib is longer than the gap, and a drain hole is formed between the ribs (see Patent Literature 1, for example).

CITATION LIST

Patent Literature

[Patent Literature 1]
Japanese Utility Model Laid-Open No. 58-097956

SUMMARY OF INVENTION

Technical Problem

The drain holes of the conventional technique are in communication with the outside of the housing; thus, the conventional technique has a risk of allowing external air to burst into the casing and thus a large amount of foreign matter such as sand and dirt, entrained in the airflow, to enter the casing when negative pressure is created inside the casing.

Foreign matter thus entered in the casing may adhere to the drive unit, electrical and electronic components, and sliding parts of the work machine and thereby cause malfunction.

The present invention has been achieved in the viewpoints described above and has an object of providing a work machine that can discharge water collected inside a casing to the outside, reduce leakage of noise, and reduce entry of foreign matter from outside.

Solution to Problem

To attain the object described above, a work machine according to an aspect of the present invention includes a bottom portion cover forming a portion of a casing, the bottom portion cover including: at least two strengthening structure portions formed substantially perpendicular to a bottom surface of the bottom portion cover; and a drain hole located in a connecting portion connecting the bottom surface of the bottom portion cover and a strengthening structure portion among the at least two strengthening structure portions, the strengthening structure portion having an upper portion located over the drain hole.

The upper portion of the strengthening structure portion is located over the drain hole and thus configured so that air flowing inside from the drain hole collides with the strengthening structure portion once and thereby the flow of air is hindered. Thus, the flow of air from outside can be weakened, and the entry of foreign matter can also be reduced. As a result, malfunction of an engine, electrical and electronic components, and sliding parts due to the entry of foreign matter can be inhibited.

Furthermore, the strengthening structure portions can attenuate noise generated inside the casing due to vibration of the engine, before the noise reaches the drain hole, and thereby inhibit noise. Furthermore, water inside the casing can be discharged outside from the bottom portion cover through the drain hole.

In the configuration described above, the at least two strengthening structure portions include: water-discharging structure portions each including the drain hole; and a blocked structure portion including no drain hole, and the blocked structure portion is located between the water-discharging structure portions.

Thus, since the blocked structure portion is located between the water-discharging structure portions, water collected in a plurality of regions can be discharged by one drain hole efficiently.

In the configuration described above, the at least two strengthening structure portions of the bottom portion cover are formed in a lattice shape, the at least two strengthening structure portions intersecting with each other substantially orthogonally in the lattice shape, and the drain hole is formed at a position of intersection of the at least two strengthening structure portions.

Thus, water in a plurality of regions partitioned by the strengthening structure portions in the bottom portion cover can be discharged from the drain hole efficiently. As a result, the number of drain holes can be reduced, leakage of noise from inside the casing can be reduced, and the entry of foreign matter and the like from outside through the drain hole can be inhibited.

In the configuration described above, each of the at least two strengthening structure portions is a bead or a rib for reinforcing the bottom portion cover.

Thus, water in a region formed using the beads and the ribs can be discharged from the drain hole efficiently.

In the configuration described above, the bottom portion cover is located at a bottom portion of the casing of a generator to support an engine of the generator.

Thus, water in a plurality of regions partitioned by the strengthening structure portions in the bottom portion cover of the generator can be discharged from the drain hole efficiently. Additionally, the number of drain holes can be reduced, leakage of engine noise from inside the casing can be reduced, and the entry of foreign matter and the like from outside through the drain hole can be inhibited; thus, malfunction of the engine, electrical and electronic components, and sliding parts of the generator can be inhibited.

In the configuration described above, the at least two strengthening structure portions are formed between engine-retaining structure portions for supporting the engine.

Thus, the number of regions partitioned by the strengthening structure portions is increased in order to ensure strength for supporting the engine; thus, the structure in which water collected in a plurality of regions can be efficiently discharged from one drain hole is extremely effective.

Advantageous Effects of Invention

In an aspect of the present invention, the flow of air from outside can be weakened, and the entry of foreign matter can also be reduced. As a result, malfunction of an engine, electrical and electronic components, and sliding parts due to the entry of foreign matter can be inhibited. Furthermore, the strengthening structure portions can attenuate noise generated inside the casing due to vibration of the engine, before the noise reaches the drain hole, and thereby inhibit noise. Furthermore, water inside the casing can be discharged outside from the bottom portion cover through the drain hole.

DESCRIPTION OF EMBODIMENT

An embodiment of the present invention is described below with reference to the drawings. In the present embodiment, a generator is used as a work machine as an example.

Figure 1:
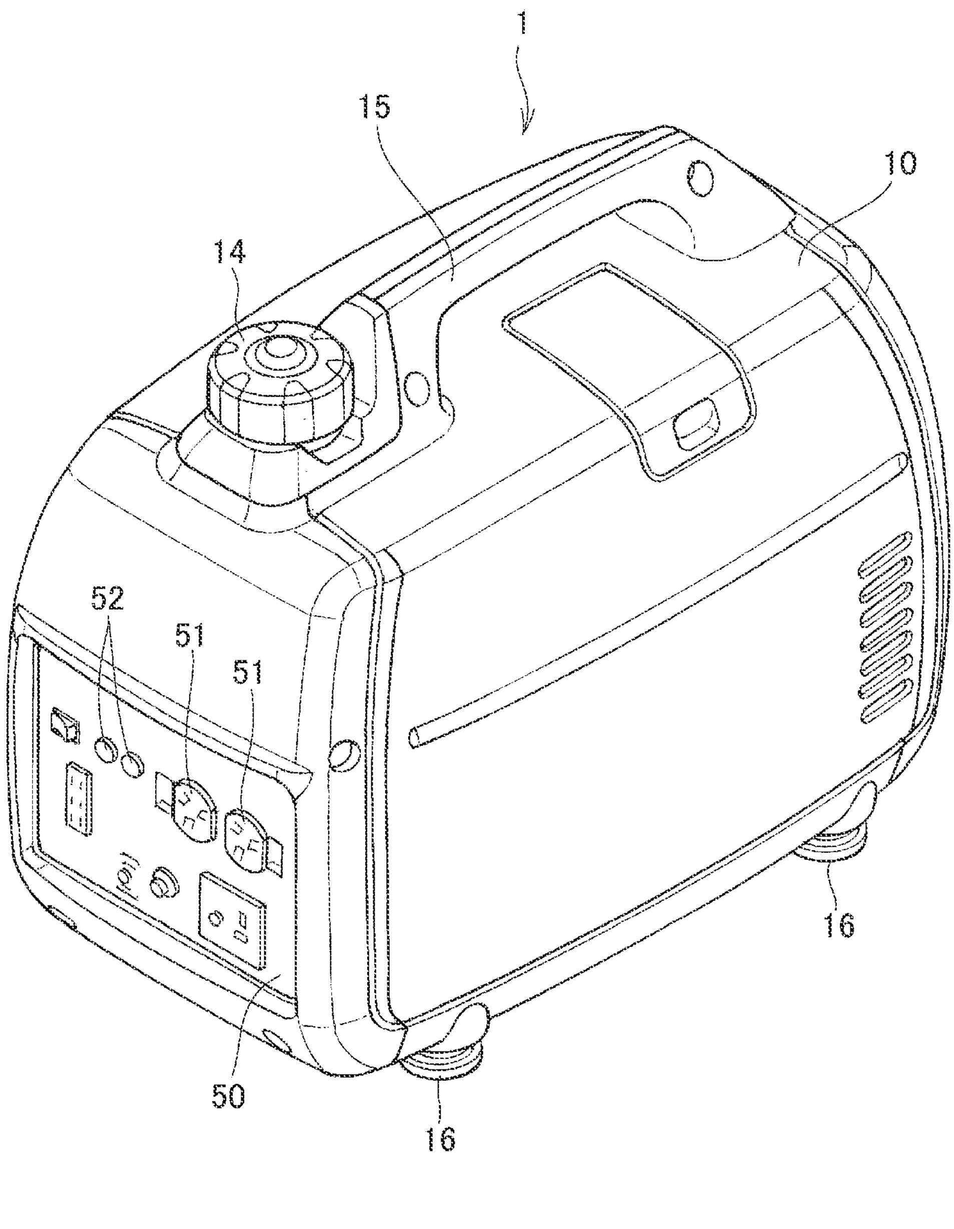
FIG. 1 is an exterior view showing an embodiment in which a generator is used as a work machine according to the present invention.
Figure 2:
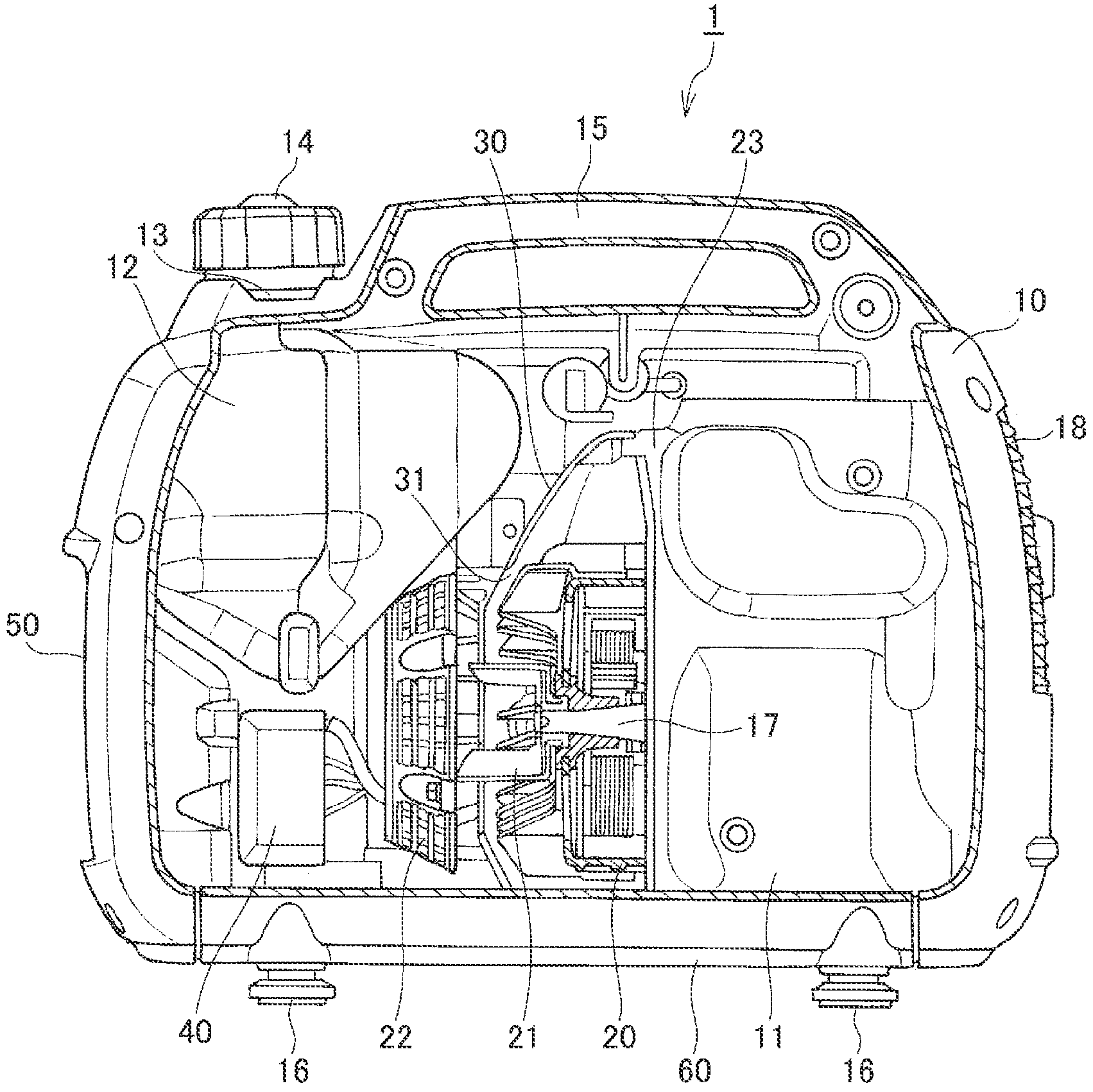
FIG. 2 is a sectional view showing the generator of the present embodiment.

FIG. 1 is a perspective view showing an external appearance of the generator according to the present invention. FIG. 2 is a sectional view of the generator.

As shown in FIGS. 1 and 2, a generator 1 in the present embodiment includes a casing 10 made of resin and having a substantially rectangular parallelepiped shape. In the casing 10, an engine 11 is housed toward the rear of the casing 10 (on the right-hand side in FIG. 2). Also in the casing 10, a fuel tank 12 is housed toward the front of the casing 10 (on the left-hand side in FIG. 2). A fuel filler opening 13 of the fuel tank 12 is located at a top plate of the casing 10 and protrudes outward from the casing 10. A fuel filler cap 14 for opening or closing the fuel filler opening 13 is detachably attachable to the fuel filler opening 13.

A handle 15 is located on an upper face of the casing 10, and a plurality of legs 16 for supporting the casing 10 is attached to a bottom portion cover 60 located at a lower face of the casing 10.

The engine 11 includes a cylinder, a combustion chamber, and a crankcase (all not shown), and the cylinder houses a piston (not shown) in a fashion that enables reciprocating motion. The engine 11 also includes an output shaft 17 that is rotated by the operation of the piston.

The output shaft 17, protruding forward from the engine 11, is attached to an alternator 20 coaxially. A fan 21 is attached to the output shaft 17 coaxially, forward of the alternator 20.

A recoil starter 22 for starting the engine 11 is located forward of the fan 21.

Operating the engine 11 rotates the alternator 20 to generate electricity, and also rotates the fan 21 to introduce external air into the casing 10 and blow air toward the engine 11.

At a location inside the casing 10 and outside the engine 11, a shroud 23 is situated for guiding air blown by the fan 21 to the area near the engine 11.

A fan cover 30 is located at a front end of the shroud 23 and covers the alternator 20 and the fan 21. The fan cover 30 is tapered to decrease in diameter toward the front of the fan cover 30 and has a ventilation opening 31 at a front end portion of the fan cover 30. The ventilation opening 31 is substantially concentric with a rotation axis of the engine 11.

The fan cover 30 is made of metal or other materials having a high thermal conductivity, and specifically, the fan cover 30 is made of, for example, aluminum, aluminum alloy, or the like.

An inverter 40 is located forward of the fan.

A control panel 50, which includes power sockets 51, operation buttons 52, and the like, is attached to a front face of the casing 10 at a lower location.

An air inlet opening (not shown) for introducing external air into the casing 10 is formed in a side plate located at the front face of the casing 10 at a location lower than the control panel 50, and an air outlet opening 18 is formed in a rear face of the casing 10.

Operating the engine 11 to rotate the fan 21 introduces external air into the casing 10 through the air inlet opening, and the air introduced flows through the ventilation opening 31 into the fan cover 30 and passes between the engine 11 and the shroud 23 to cool the engine 11 before discharged outside through the air outlet opening 18.

The bottom portion cover 60 of the casing 10 is described next below.

Figure 3:
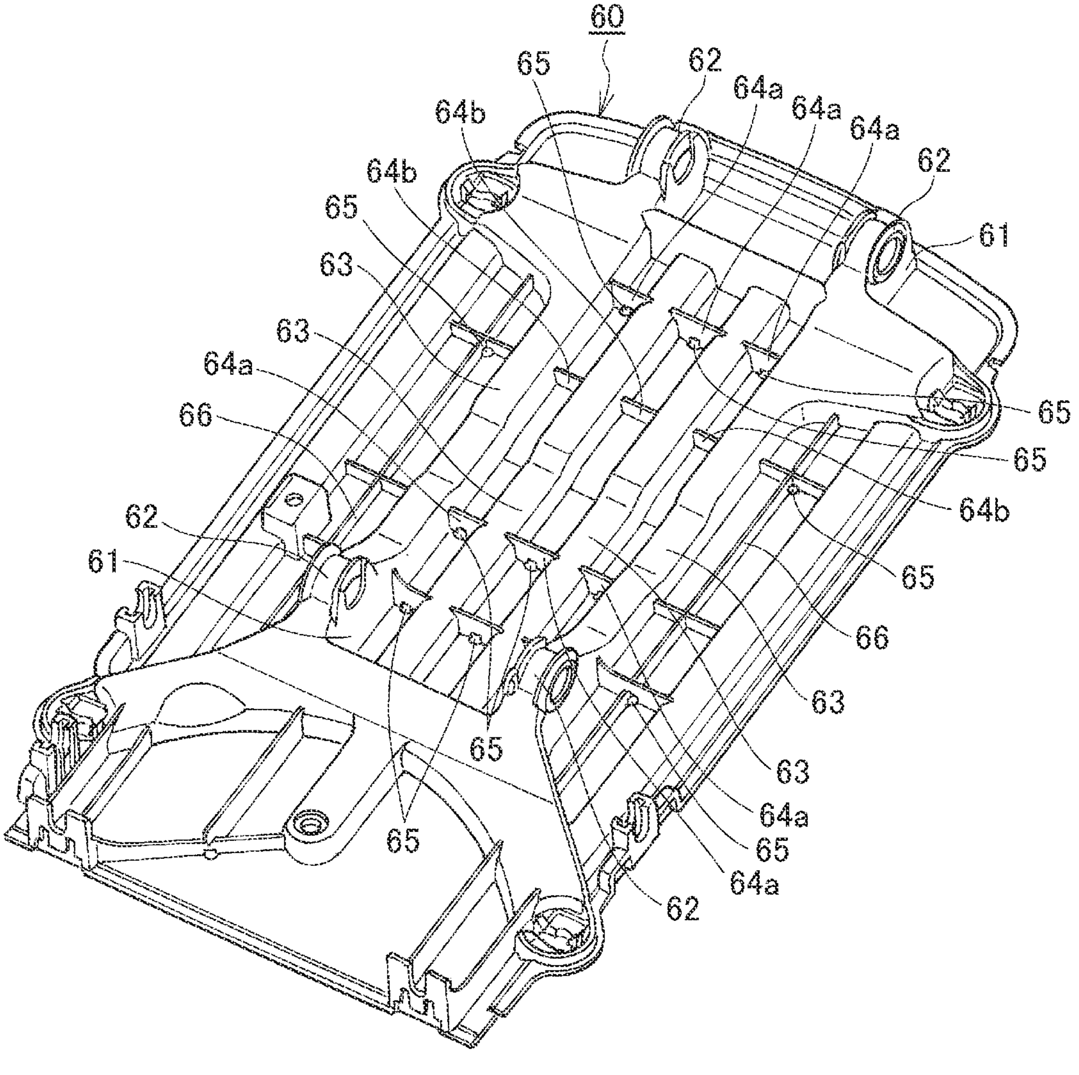
FIG. 3 is a perspective view showing a bottom portion cover of the present embodiment.
Figure 4:
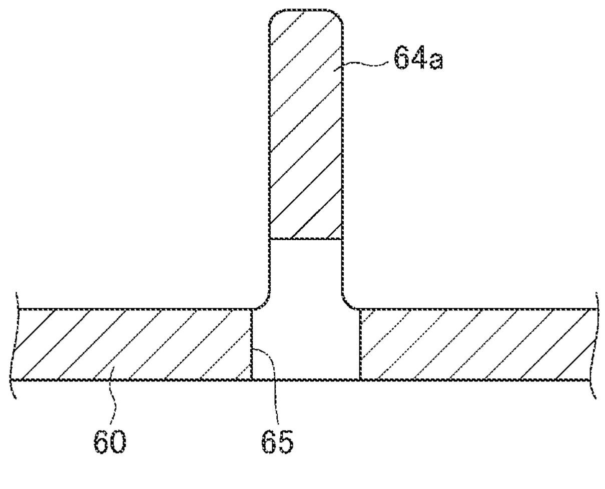
FIG. 4 is a sectional view showing a drain hole portion of FIG. 3.
Figure 5:
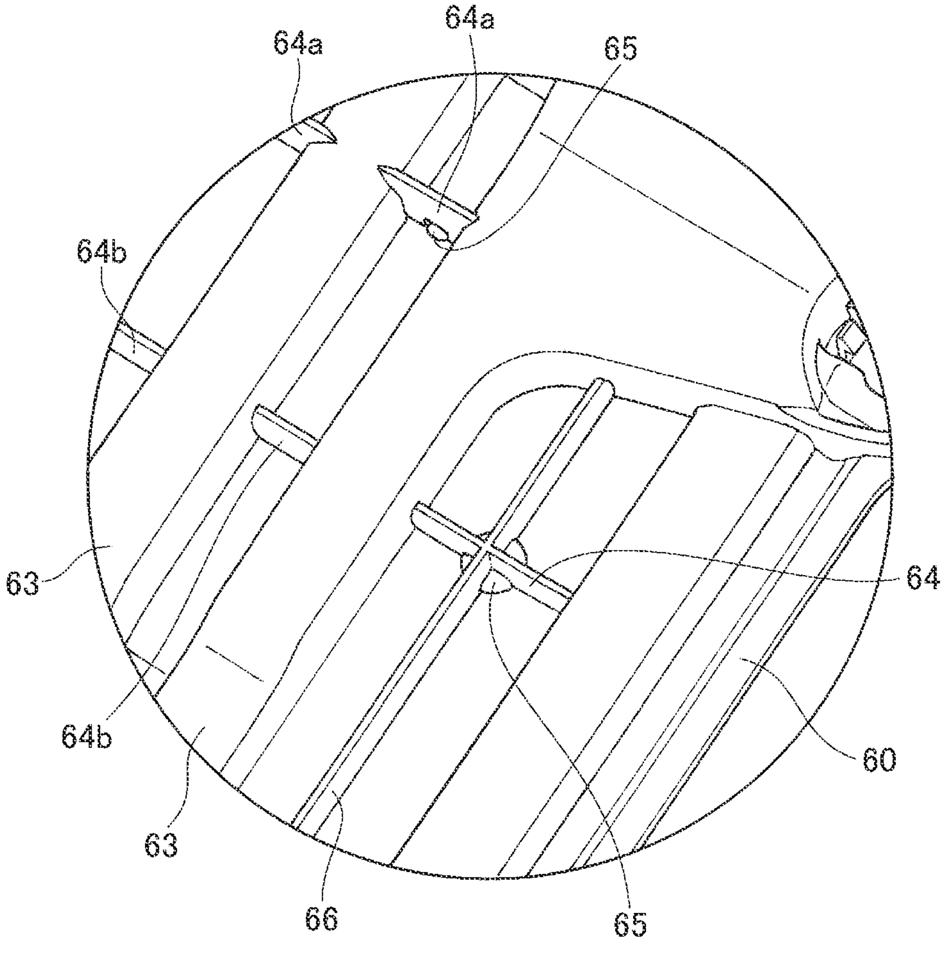
FIG. 5 is a perspective view showing a drain hole portion at ribs near one of opposing sides in FIG. 3.
Figure 6:
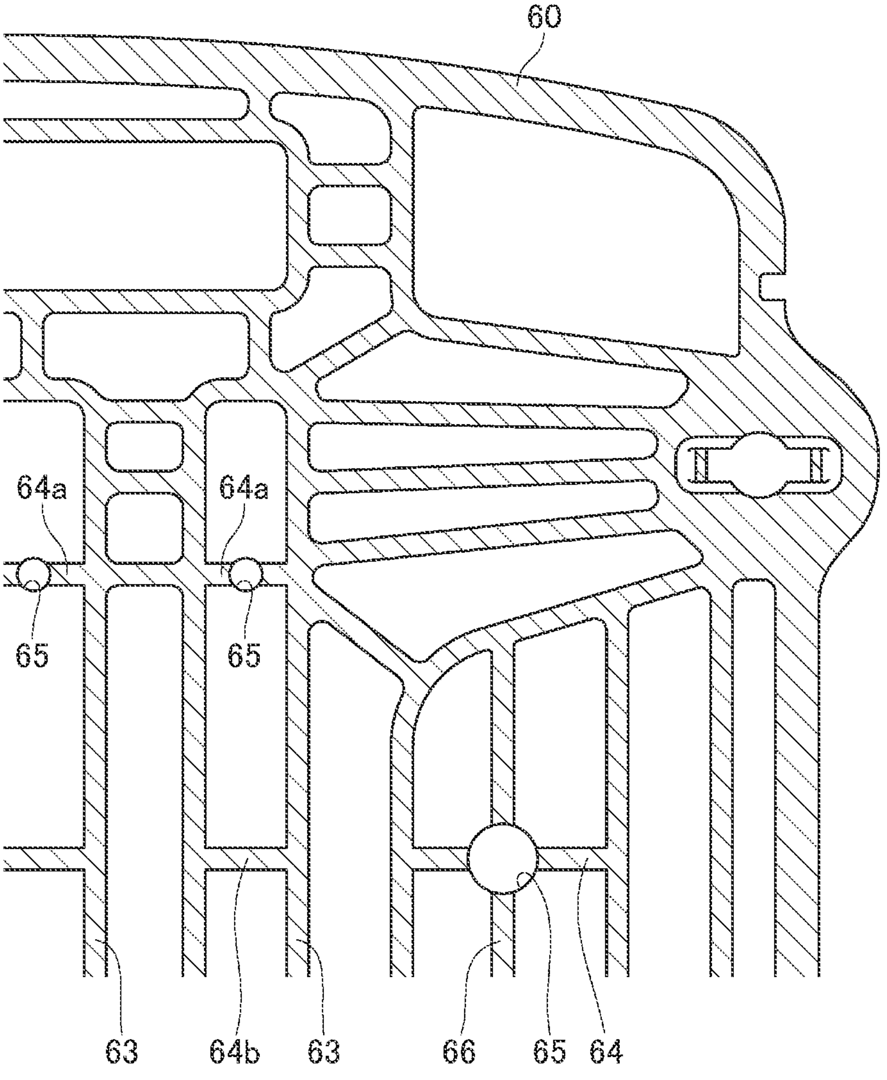
FIG. 6 is a cross sectional view of FIG. 5.

FIG. 3 is a perspective view showing the bottom portion cover 60 according to the present embodiment. FIG. 4 is a sectional view showing a drain hole portion of FIG. 3. FIG. 5 is a perspective view showing a drain hole portion at a rib 64 and a second rib 66 near one of opposing sides in FIG. 3. FIG. 6 is a cross sectional view of FIG. 5.

As shown in FIG. 3, engine-retaining structure portions 61 for securing a lower portion of the engine 11 are located on an upper face of the bottom portion cover 60 of the casing 10. In each of the engine-retaining structure portions 61, threaded-hole members 62 are located at a predefined spacing between the threaded-hole members 62 in a width direction.

The engine-retaining structure portions 61 are configured to secure the engine 11 to the bottom portion cover 60 using the threaded-hole members 62 and bolts (not shown) passing through the lower portion of the engine 11.

Between the engine-retaining structure portions 61 of the bottom portion cover 60, a plurality of (four in the present embodiment) beads 63 is formed as strengthening structure portions. The beads 63 extend in a front-rear direction of the bottom portion cover 60. The bead 63 has a hump shape raised upward and has a predefined width dimension. Forming the beads 63 can increase the strength of the bottom portion cover 60.

Between the beads 63 as well as between each of opposing side walls of the bottom portion cover 60 and an associated one of side beads 63, located at the opposing sides, among the plurality of beads 63, a plurality of ribs 64 is formed as strengthening structure portions. The ribs 64 extend in the width direction of the bottom portion cover 60 and are substantially orthogonal to the beads 63.

Between each of the side beads 63 and the associated one of the side walls of the bottom portion cover 60, the second rib 66 is also formed extending substantially parallel to the beads 63.

In the present embodiment, the beads 63 and the ribs 64 configure strengthening structure portions of the present invention.

In the present embodiment, as shown in FIG. 4, a drain hole 65 is formed at a location in a boundary portion between a rib 64, located between the beads 63, and the bottom portion cover 60 and in a substantially middle portion of the rib 64 in the width direction of the rib 64. The drain hole 65 passes through the rib 64 and the bottom portion cover 60. An upper portion of the rib 64 is located over the drain hole 65.

A drain hole 65 is formed in alternate ribs 64.

Those ribs 64 including the drain hole 65 are water-discharging ribs 64*a* that are water-discharging structure portions, and those ribs 64 including no drain hole 65 are blocked ribs 64*b* that are blocked structure portions.

A blocked rib 64*b* is located between water-discharging ribs 64*a*; thus, the water-discharging ribs 64*a* and the blocked ribs 64*b* are located alternately.

One region is thus formed by a water-discharging rib 64*a*, a blocked rib 64*b*, and beads 63. In the present embodiment, two adjacent regions having a water-discharging rib 64*a* therebetween can be drained by one drain hole 65.

Thus, water collected in a region surrounded by a water-discharging rib 64*a*, a blocked rib 64*b*, and beads 63 can be drained through the associated drain hole 65.

As shown in FIGS. 5 and 6, between each of the side beads 63 and the associated one of the side walls of the bottom portion cover 60, the second rib 66 is formed as a strengthening structure portion. The second ribs 66 extend substantially parallel to the beads 63. A drain hole 65 is formed in a boundary portion between a location at which a rib 64 and the second rib 66 intersect with each other and the bottom portion cover 60.

Thus, in this case, four regions surrounded by ribs 64, a second rib 66, a side bead 63, and a side wall of the bottom portion cover 60, intersecting with each other, can be drained through one drain hole 65.

In this case also, the water-discharging ribs 64*a* and the blocked ribs 64*b* are located alternately.

In the present embodiment, in the region where the beads 63 and ribs 64 are formed, a drain hole 65 is located in a substantially middle portion of a rib 64 in the width direction of the rib 64, whereas in the regions between each of the side beads 63 and the associated one of the side walls of the bottom portion cover 60, a drain hole 65 is formed at a location at which a rib 64 and the second rib 66 intersect with each other. However, this is not a limitation to the present invention.

For example, in the region where the beads 63 and ribs 64 are formed, a drain hole 65 may be located in a boundary portion between a bead 63 and a rib 64, and in the region between each of the side beads 63 and the associated one of the side walls of the bottom portion cover 60, a drain hole 65 may be formed at a location other than the location at which a rib 64 and the second rib 66 intersect with each other.

Alternatively, the bottom portion cover 60 may include only ribs 64 in a lattice shape and include no bead 63, and a drain hole 65 may be formed in a portion of, or an intersecting portion of, the ribs 64 in the lattice shape.

Operation of the present embodiment is described next below.

In the present embodiment, when the engine 11 is started by operation of the recoil starter 22, the operation of the engine 11 rotates the output shaft 17, which in turn drives the alternator 20 and generates electricity.

At the same time, the rotation of the output shaft 17 operates the fan 21.

The operation of the fan 21 introduces external air into the casing 10 through the air inlet opening, and the air introduced flows through the ventilation opening 31 of the fan cover 30 into the fan cover 30. Air flowing into the fan cover 30 passes between the engine 11 and the shroud 23 to cool the engine 11 before discharged outside through the air outlet opening 18.

Air having introduced from outside and flowing through the casing 10 creates negative pressure inside the casing 10, and as a result, external air will be drawn inside through the drain holes 65.

In the present embodiment, the upper portion of the water-discharging rib 64*a* is located over the drain hole 65 and thus configured so that air flowing inside from the drain hole 65 collides with a lower surface of the upper portion of the water-discharging rib 64*a* once and thereby the flow of air is hindered. Thus, the flow of air from outside can be weakened, and the entry of foreign matter can also be reduced.

Furthermore, since a plurality of regions is formed, each region being surrounded by a water-discharging rib 64*a*, a blocked rib 64*b*, and beads 63, noise generated inside the casing 10 due to vibration of the engine 11 collides with the water-discharging ribs 64*a*, the blocked ribs 64*b*, or the beads 63 before reaching the drain holes 65 and can be thereby attenuated. As a result, noise is attenuated before it is emitted to the outside from the drain holes 65 and thereby can be inhibited.

Moreover, condensation water due to outside temperature rise and fall and water entering the casing 10 through gaps in the casing 10 will drop onto the bottom portion cover 60 to be collected thereon. Water collected on the bottom portion cover 60 is discharged outside through the drain holes 65. Since the drain hole 65 is formed to discharge water from a plurality of regions in the present embodiment, water collected in the plurality of regions can be discharged by one drain hole 65 efficiently.

The water-discharging ribs 64*a*, the blocked ribs 64*b*, the second ribs 66, and the beads 63 are located between the engine-retaining structure portions 61 of the bottom portion cover 60, and the number of regions partitioned by the water-discharging ribs 64*a*, the blocked ribs 64*b*, the second ribs 66, the beads 63, and the side walls of the bottom portion cover 60 is increased in order to ensure strength for supporting the weight of the engine 11; thus, the structure in which water collected in a plurality of regions can be efficiently discharged from one drain hole 65 is extremely effective.

As described above, the present embodiment includes the bottom portion cover 60 forming a portion of the casing 10, and the bottom portion cover 60 includes: at least two ribs 64 and a bead 63 (strengthening structure portions) that are formed substantially perpendicular to the bottom surface of the bottom portion cover 60; and a drain hole 65 located in a connecting portion connecting the bottom surface of the bottom portion cover 60 and a water-discharging rib 64*a* among the at least two ribs 64. An upper portion of the water-discharging rib 64*a* is located over the drain hole 65.

The upper portion of the water-discharging rib 64*a* is located over the drain hole 65 and thus configured so that air flowing inside from the drain hole 65 collides with the water-discharging rib 64*a* once and thereby the flow of air is hindered. Thus, the flow of air from outside can be weakened, and the entry of foreign matter can also be reduced. As a result, malfunction of the engine 11, electrical and electronic components, and sliding parts due to the entry of foreign matter can be inhibited.

Furthermore, the water-discharging ribs 64*a*, the blocked ribs 64*b*, and the beads 63 can attenuate noise generated inside the casing 10 due to vibration of the engine 11, before the noise reaches the drain holes 65, and thereby inhibit noise. Furthermore, water inside the casing 10 can be discharged outside from the bottom portion cover 60 through the drain holes 65.

Furthermore, in the present embodiment, the at least two ribs 64 (the strengthening structure portions) include: water-discharging ribs 64*a* (water-discharging structure portions) each including the drain hole 65; and a blocked rib 64*b* (a blocked structure portion) including no drain hole 65. The blocked rib 64*b* is located between the water-discharging rib 64*a*.

Since the blocked rib 64*b* is located between the water-discharging ribs 64*a*, water collected in a plurality of regions can be discharged by one drain hole 65 efficiently.

Furthermore, in the present embodiment, ribs 64 and a second rib 66 (a strengthening structure portion) of the bottom portion cover 60 are formed in a lattice shape in which the ribs 64 and the second rib 66 intersect with each other substantially orthogonally, and a drain hole 65 is formed at a position of intersection of a rib 64 and the second rib 66.

Thus, water in a plurality of (four) regions partitioned by the ribs 64 in the bottom portion cover 60 can be discharged from the drain hole 65 efficiently. As a result, the number of drain holes 65 can be reduced, leakage of noise from inside the casing 10 can be reduced, and the entry of foreign matter and the like from outside through the drain holes 65 can be inhibited.

Furthermore, in the present embodiment, the ribs 64, the second ribs 66, and the beads 63 (the strengthening structure portions) are formed between the engine-retaining structure portions 61 for supporting the engine 11.

Thus, the number of regions partitioned by the ribs 64 and the beads 63 is increased in order to ensure strength for supporting the engine 11; thus, the structure in which water collected in a plurality of regions can be efficiently discharged from one drain hole 65 is extremely effective.

The present invention is not limited to the aforementioned embodiment and can be modified or changed in various ways within a scope not departing from the spirit of the present invention.

For example, in the embodiment described above, a case is described in which a generator is used as the work machine. However, this is not a limitation, and the present invention can be applied to any work machine that may collect water inside its casing and generate noise.

REFERENCE SIGNS LIST

1 generator
10 casing
11 engine
12 fuel tank
20 alternator
21 fan
23 shroud
40 inverter
60 bottom portion cover
61 engine-retaining structure portion
63 bead
64 rib
64*a* water-discharging rib
64*b* blocked rib
65 drain hole
66 second rib

The invention claimed is:

1. A work machine comprising a bottom portion cover forming a portion of a casing of a generator, the bottom portion cover comprising:

a plurality of strengthening structure portions formed substantially perpendicular to a bottom surface of the bottom portion cover; and a plurality of drain holes, each of which is located in a connecting portion connecting the bottom surface of the bottom portion cover and an associated one of the plurality of strengthening structure portions, each of the plurality of strengthening structure portions having an upper portion located over the plurality of drain holes, wherein the plurality of strengthening structure portions includes a lattice portion formed in a lattice shape and includes: two first strengthening structure portions extending in parallel to each other and a second strengthening structure portion intersecting with and being substantially orthogonal to the two first strengthening structure portions, the plurality of drain holes comprises:

a first drain hole formed in the lattice portion at a position of intersection of one of the two first strengthening structure portions and the second strengthening structure portion, a second drain hole formed at a location in which the lattice portion is not formed, in a substantially middle portion of a further second strengthening structure portion in a longitudinal direction of the further second strengthening structure portion, the bottom portion cover is located at a bottom portion of the casing of the generator to support an engine of the generator, the plurality of strengthening structure portions are formed between engine-retaining structure portions for supporting the engine, the engine-retaining structure portions being formed on the upper surface of the bottom portion cover.

2. The work machine according to claim 1, wherein the plurality of strengthening structure portions define:

at least two water-discharging structure portions each including one of the plurality of drain holes; and a blocked structure portion including no drain hole, and the blocked structure portion is located between two of the at least two water-discharging structure portions.

3. The work machine according to claim 1, wherein each of the plurality of strengthening structure portions includes a bead or a rib for reinforcing the bottom portion cover.

4. The work machine according to claim 2, wherein each of the plurality of strengthening structure portions includes a bead or a rib for reinforcing the bottom portion cover.

5. The work machine according to claim 1, wherein the second drain hole is formed at a location in a boundary portion between the further second strengthening structure portion and the bottom portion cover, said further second strengthening structure portion being located between two third strengthening structure portions, said second drain hole being in a substantially middle portion of the further second strengthening structure portion in the longitudinal direction of the further second strengthening structure portion.

6. The work machine according to claim 1, wherein the second drain hole passes through the further second strengthening structure portion in a thickness direction of the further second strengthening structure portion, the thickness direction intersecting orthogonally with the longitudinal direction.

* * * * *